United States Patent
Gao

(10) Patent No.: US 10,339,349 B2
(45) Date of Patent: Jul. 2, 2019

(54) ILLUMINATION ARRANGEMENT FOR LONG WORKING RANGE LINE-SCAN IMAGING SYSTEM

(71) Applicant: Datalogic USA, Inc., Eugene, OR (US)

(72) Inventor: WenLiang Gao, Eugene, OR (US)

(73) Assignee: DATALOGIC USA, INC., Eugene, OR (US)

(*) Notice: Subject to any disclaimer, the term of this patent is extended or adjusted under 35 U.S.C. 154(b) by 0 days.

(21) Appl. No.: 15/663,317

(22) Filed: Jul. 28, 2017

(65) Prior Publication Data

US 2019/0034678 A1    Jan. 31, 2019

(51) Int. Cl.
| | |
|---|---|
| *G06K 7/10* | (2006.01) |
| *G06K 9/20* | (2006.01) |
| *H04N 1/028* | (2006.01) |
| *H04N 1/03* | (2006.01) |
| *G02B 17/02* | (2006.01) |
| *H04N 1/193* | (2006.01) |

(52) U.S. Cl.
CPC ....... *G06K 7/10732* (2013.01); *G02B 17/023* (2013.01); *G06K 9/2036* (2013.01); *H04N 1/02865* (2013.01); *H04N 1/03* (2013.01); *H04N 1/0305* (2013.01); *H04N 1/193* (2013.01); *G06K 2207/1018* (2013.01)

(58) Field of Classification Search
CPC ........... G06K 7/10732; G06K 7/10722; G06K 9/2036; G06K 9/209; H04N 1/02865; H04N 1/03; G06T 1/0007
USPC .......... 348/135, 159, 450; 382/127; 235/470
See application file for complete search history.

(56) References Cited

U.S. PATENT DOCUMENTS

| | | | |
|---|---|---|---|
| 6,382,513 B1 | 5/2002 | Dvorkis et al. | |
| 9,704,250 B1* | 7/2017 | Shah | G06T 7/0065 |
| 2001/0035489 A1* | 11/2001 | Chaleff | G06K 7/10722 |
| | | | 250/201.1 |
| 2003/0174209 A1* | 9/2003 | Piazzi | G06K 7/10722 |
| | | | 348/135 |
| 2005/0169506 A1* | 8/2005 | Fenrich | G06K 9/00026 |
| | | | 382/127 |
| 2007/0103581 A1* | 5/2007 | Dwinell | G03B 15/02 |
| | | | 348/345 |

(Continued)

FOREIGN PATENT DOCUMENTS

WO    2016105615 A1    6/2016

OTHER PUBLICATIONS

Extended Search Report dated Dec. 5, 2018 in European Patent Application No. 18185984.4, 7 pages.

*Primary Examiner* — Michael E Teitelbaum
*Assistant Examiner* — Sean N. Haiem
(74) *Attorney, Agent, or Firm* — Shook, Hardy & Bacon, L.L.P.

(57) ABSTRACT

A line-scan imaging camera can scan an object at a near field and a far field using a low F-stop value by reading out different rows on an imager. A line LED provides a line illumination over an object. Additionally, the imaging camera captures the illumination portion of the object through an optical path that includes mirrors that allow folded optics. The optical path is longer than the distance between the object and the camera. A mirror is located close to or adjacent to the line LED to provide efficient illumination and to align the initial leg of the optical path with the line illumination.

12 Claims, 5 Drawing Sheets

(56) References Cited

U.S. PATENT DOCUMENTS

| | | | |
|---|---|---|---|
| 2010/0013934 A1* | 1/2010 | Saporetti | G06K 7/10732 348/159 |
| 2011/0168780 A1* | 7/2011 | McQueen | G06K 7/10722 235/470 |
| 2012/0307322 A1 | 12/2012 | Ozawa et al. | |
| 2017/0372157 A1* | 12/2017 | Liu | G06K 9/209 |

* cited by examiner

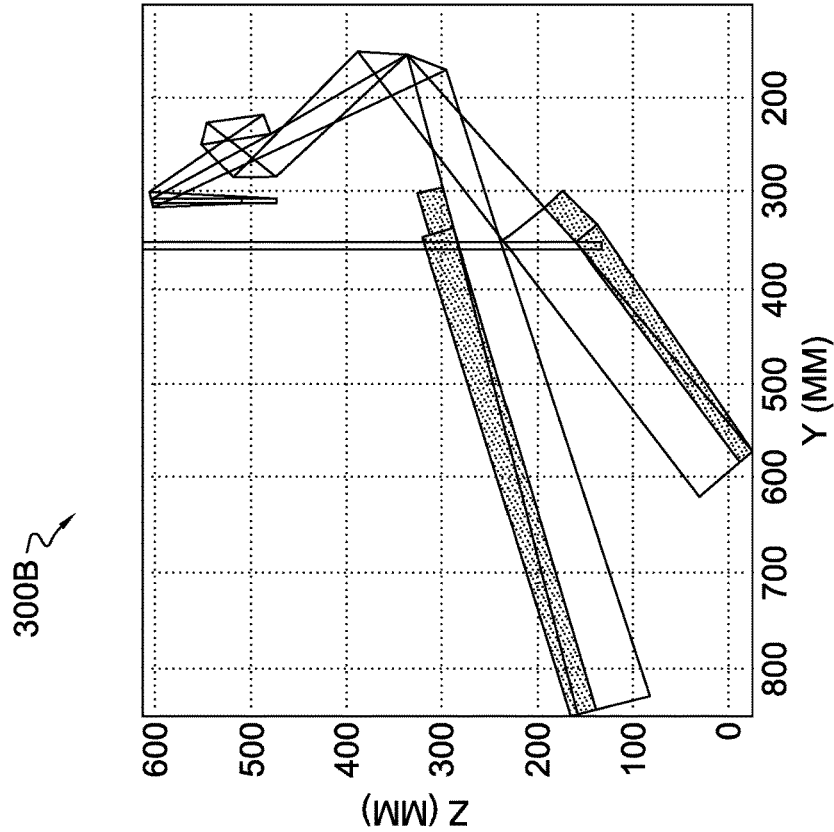
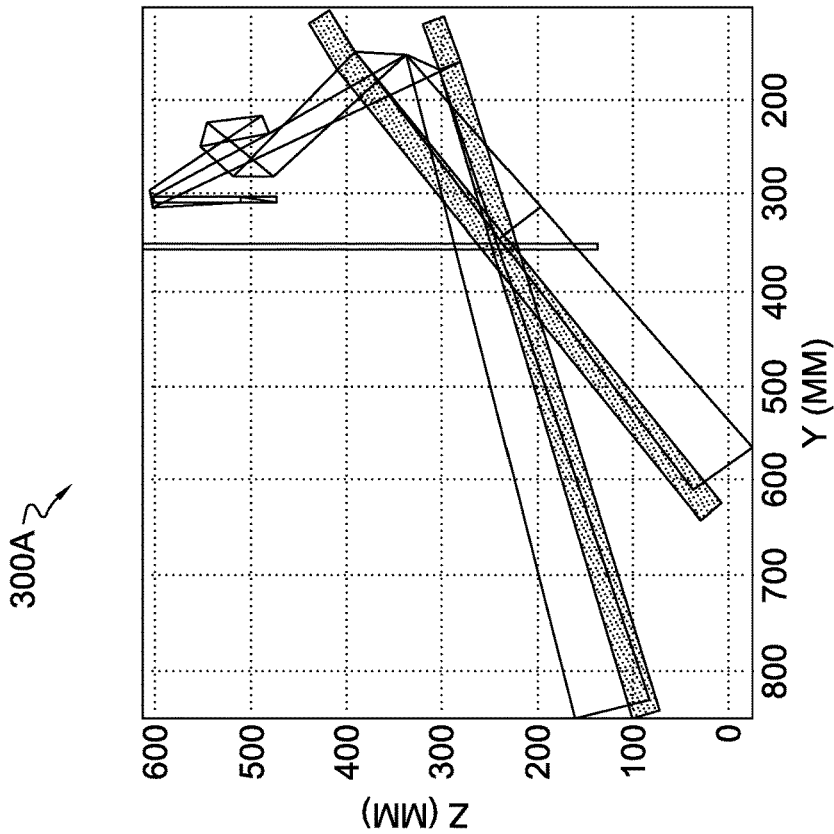
FIG. 3A.
FIG. 3B.

ILLUMINATION ARRANGEMENT FOR LONG WORKING RANGE LINE-SCAN IMAGING SYSTEM

CROSS-REFERENCE TO RELATED APPLICATIONS

None.

BACKGROUND OF THE INVENTION

Line scan technology is used in applications that image large objects, are high-resolution, are high-speed, need perfect images, or need real-time correction of pixels' responses. The camera has a single line of pixels and either the camera or object is moved perpendicular to that line of pixels to build up a two-dimensional image of the object.

Line scan imaging is usually used in short depth of field applications, such as a flat scanner, web inspection, etc., so that the line illumination design can have a short depth of field. Also, the alignment between the image sensor and the illumination is not an issue.

For long working distance application without folding optics, a lens/imager is built in the center of collimated line light. The alignment of the image sensor and the illumination is not an issue since lens and illumination have coaxial design.

Usually, the optical path from the imager to a target is a long distance, such as greater than 1000 millimeters, in order to cover a wide view with a long depth of field. If an imaging system's optical line and illumination line are co-axial, the illumination has to be located far away from the target. In order to cover the depth of field, usually a very high f-stop lens, such as F/12 and higher is required. Currently, there is no way to separate into two depths of fields (i.e. near field and far field) with one imaging camera where the F-stop of the lens is lower so that the imaging system is more illumination efficient.

SUMMARY

Embodiments of the present invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

The present invention provides a new and effective way to perform line scanning with an imaging camera for a long depth of field using a short distance to a target and a low F-stop number in the camera lens. The present invention also provides a way to perform line scanning with the camera for both short depth of field and long depth of field using a short distance to the target and a low F-stop number. By implementing the features of the present invention, an imaging system can be compact, low cost, and illumination efficient.

BRIEF DESCRIPTION OF THE SEVERAL VIEWS OF THE DRAWINGS

Illustrative embodiments of the present invention are described in detail below with reference to the included drawing figures, wherein:

FIG. 3A is an exemplary illustration of line-scans in a conveyor scanning system from a single camera, implemented in accordance with an embodiment of the present invention;

FIG. 3B is another exemplary illustration of line-scans in a conveyor scanning system from a single camera, implemented in accordance with an embodiment of the present invention;

DETAILED DESCRIPTION

Figure 1:
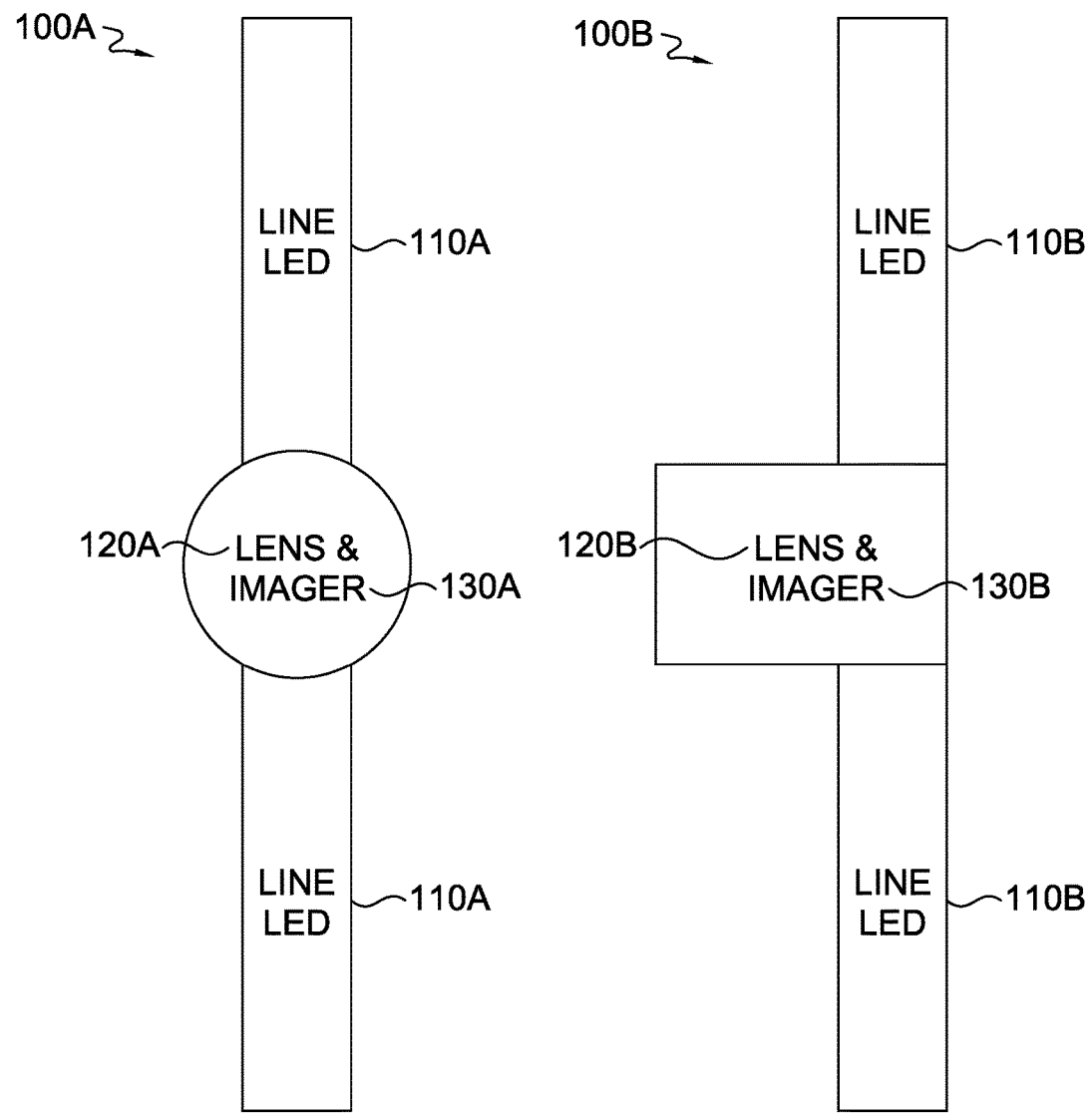
FIG. 1 contains exemplary illustrations of a line illumination and imaging camera setup, implemented in accordance with an embodiment of the present invention.

Embodiments of the present invention relate generally to a line-scan imaging system that can scan at a short depth of field and a long depth of field using a lens with a small F-stop value. Accordingly, the present invention implements light emitting diodes (LEDs), a collimating lens, and mirrors in a camera to achieve a line scan of an object that is located close to the camera. Typically, the camera is used in a scanning system with a conveyor belt mechanism where the object can move in a perpendicular direction to the line scan and the line illumination provided by the LEDs.

In a first aspect, a line scan camera scans a long depth of field with a short distance to a target object. The line scan camera includes an image sensor, mirrors, and a light source. The image sensor receives an image of the target object through a collimating or an imaging lens. The mirrors allow folded optics along an optical path from the target object to the collimating or imaging lens. The optical path is bent with the mirrors so that the optical path is longer than a size of the line scan camera. The folded optics enable the line scan camera to be compact. The light source illuminates the target object with a line illumination without going through the mirrors. The light source is close to the target. The light source is located with one of the mirrors so that an angle between the line illumination and the optical axis from the mirror to the target object is minimized.

In a second aspect, the light source is located at the edge of the mirror. The light source is a set of light emitting diodes with or without secondary optics placed in a line.

In a third aspect, a second light source illuminates the target object with a second line illumination without going through the mirrors. The second light source is close to the target. The second light source is located with the mirror and the first light source. The first light source and the second light source enable the line scan camera to scan separately at a near field of working range and the far field of working range. The line scan camera has a low F-stop value for both the near field and the far field.

In a fourth aspect, an image scanning system scans a target object at a near field and a far field. The line scan camera is located at a short distance from the target object. The line scan camera includes an image sensor, mirrors, and light emitting diodes. The image sensor receives an image of the target object through one collimating or imaging lens. The mirrors located in the line scan camera bend an optical path from the target object to the collimating or imaging lens. The optical path is longer than a distance from the target object to the collimating or imaging lens. Light emitting diodes are located in a line. The light emitting diodes illuminate the target object with a line illumination with high illumination efficiency. The light emitting diodes are located adjacent to a mirror. The mirror is located the farthest away from the target object. The light emitting diodes and the mirror are located so that an angle between the line illumination and the optical axis from the mirror to the target object is minimized.

In a fifth aspect, the light emitting diodes are located at the edge of the mirror. The mirrors enable folded optics to occur in the line scan camera.

In a sixth aspect, a second set of light emitting diodes illuminates the target object with a second line illumination with high illumination efficiency. The second set of light emitting diodes is located adjacent to the mirror and the first light emitting diodes. The first light emitting diodes and the second set of light emitting diodes enable the line scan camera to scan separately at a near field and the far field. The line scan camera has a low F-stop value for both the near field and the far field.

In FIG. 1, line scan imaging systems 100A and 100B are shown with light emitting diodes (LEDs), a lens, and an imager. Line LED 110A and line LED 110B represent a schematic drawing of LEDs located in a line. Line LED 110A and line LED 110B illuminate a targeted object that is located a distance away. As shown, only a line is illuminated at the targeted object. In between the LEDs, a lens 120A and a lens 120B are located in the middle or between line LED 110A and line LED 110B respectively. In some embodiments, lenses 120A and 120B are collimating lenses meaning that the light that passes through them becomes a parallel beam of light or a narrow, tight beam of light. This type of lens can be used for illumination. The light passes through lenses 120A and 120B to imagers 130A and 130B. Imager 120A and imager 120B represent the imaging sensor that is located in a line scan camera. Imager 120A and imager 120B can sense or pick up that portion of the targeted object that is illuminated with the line illumination from line LEDs 110 and 110B. Although not shown, the relationship between the lenses and imagers can have lens 120A and imager 130A located on the same optical axis. The same is true for lens 120B and imager 130B.

Figure 5:
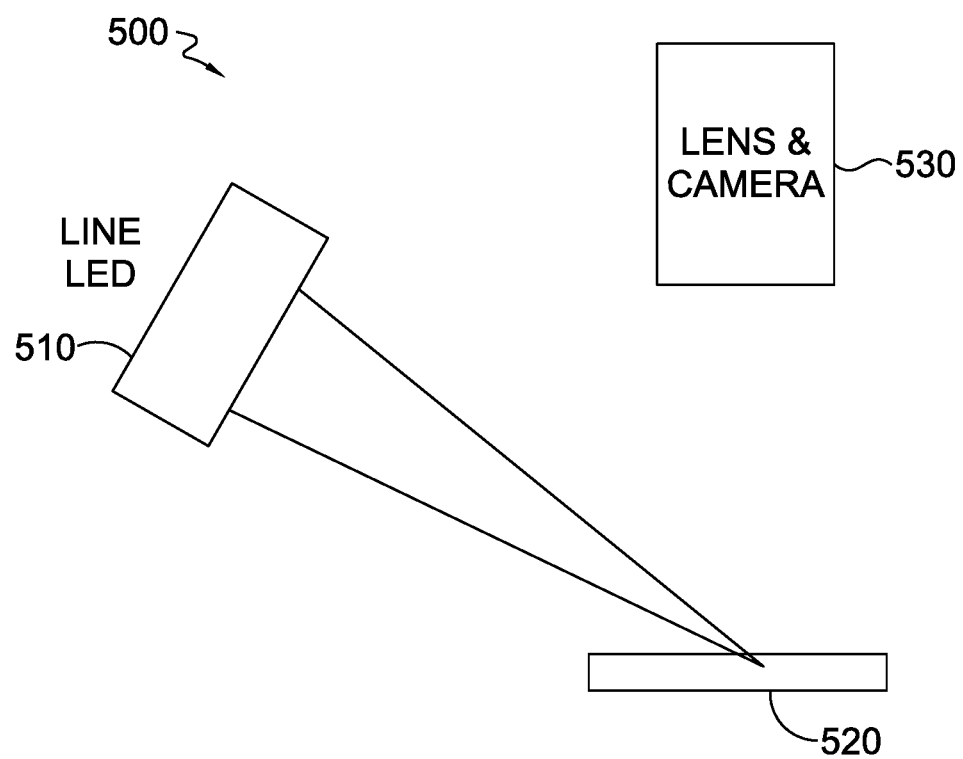
FIG. 5 is an exemplary illustration of a short depth of field line-scan system, implemented in accordance with an embodiment of the present invention.

Jumping to FIG. 5, a line scan system 500 is implemented that produces scans with a short depth of field. A line LED 510 illuminates an object 520. The illumination must have a high intensity in order to have a good illumination efficiency. Although not shown, line LED 510 consists of a row of LEDs and usually secondary optics that form a line. Line LED 510 illuminates object 520 so that camera system 530 receives or senses the illuminated part of object 520. Line LED 510 and camera system 530 are located close to object 520. As a result, line scan system 500 has a short depth of field. This means that the lens in camera system 530 has a small F-stop value.

Although not shown, the optical path for line scan system 500 goes from object 520 to camera system 530. Because the line illumination path goes from line LED 510 to object 520 and is separate from the optical path, line scan system 500 can implement a set of mirrors that bend the optical path from object 520 to camera system 530. By bending the optical path (also called folded optics), the optical path is longer than the distance from object 520 to camera system 530. As a result, line scan system 500 could implement both an optical path with a short depth of field as well as an optical path with long depth of field using the mirrors.

Figure 2:
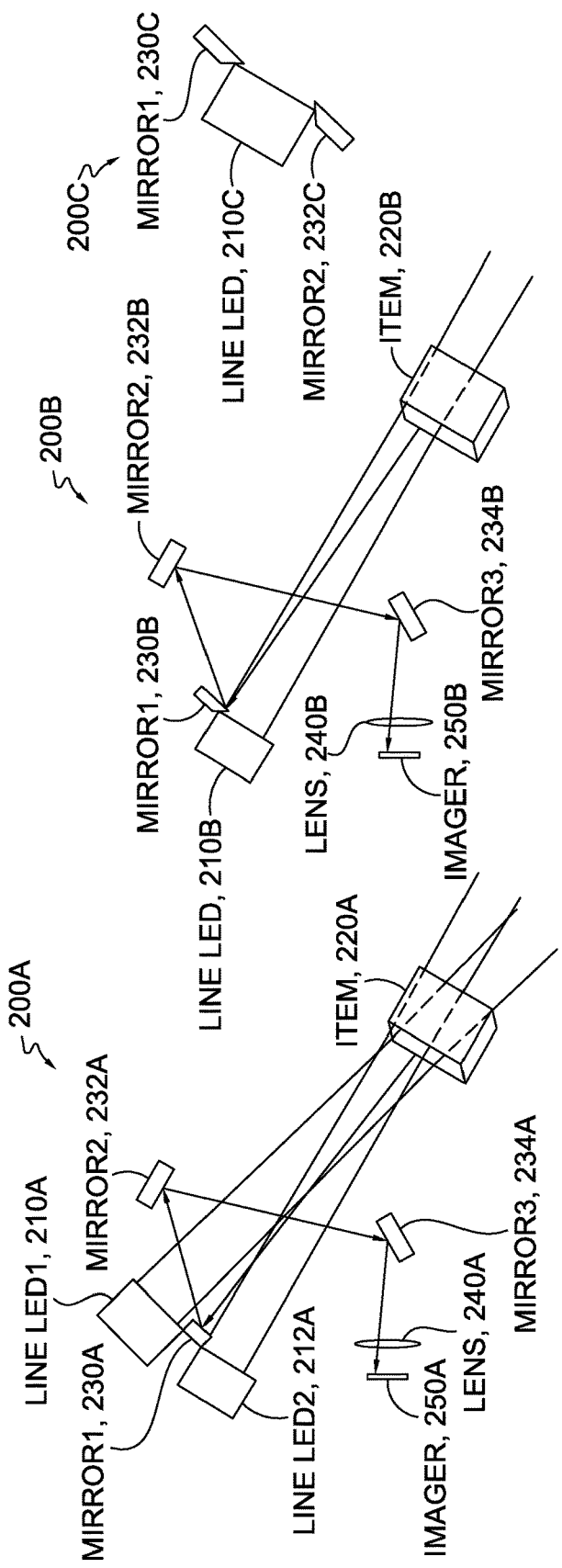
FIG. 2 is an illustration of a line-scan imaging system, implemented in accordance with an embodiment of the present invention.

Turning to FIG. 2, line scan imaging systems 200A, 200B, and 200C are arranged with optical paths for long working distance line scanning. System 200A shows line LED1 210A and line LED2 212A illuminating item 220A. The LEDs illuminate the item at slightly different angles. Mirror1 230A is positioned adjacent to line LED1 210A and line LED2 212A. Mirror1 230A enables the optical path to be bent so that an illuminated portion of item 220A, received at mirror1 230A, is sent to mirror2 232A, which then sends the optical signal to mirror3 234A. From mirror3 234A, the optical signal, over the optical path, is sent to a lens 240A. Lens 240A can be an imaging lens in some embodiments. From lens 240A, the optical signal is received or sensed by an imager 250A.

As one can see, two different line illuminations can occur on item 220A. For example, if item 220A is moving on a conveyor system, a first illumination might occur at a first short distance enabling imager 250A to capture an image at a short depth of field. Item 220A would continue down the conveyor system where a second illumination might occur at a second long distance enabling imager 250 to capture the image at a long depth of field by changing the line position on the area imager 250.

In another embodiment of the present invention, line LED 210B illuminates an item 220B. In particular, only a portion of item 220B is illuminated because line LED 210B illuminates a linear area over item 220B. As item 220B moves in a perpendicular direction to the line illumination, such as on a conveyor belt, an imager 250B captures images of the illuminated portion of item 220B. Imager 250B captures the images over an optical path that goes from item 220B to a mirror1 230B. The optical path is bent at mirror1 230B and sent to a mirror2 232B. The optical path is bent at mirror2 232B and sent to a mirror3 234B. Then finally, the optical path is bent at mirror3 234B and sent to lens 240B, which passes the optical signal over the optical path to imager 250B.

As one can see with imaging systems 200A and 200B, the LEDs used for line illumination are placed near a mirror. In many embodiments of the present invention, this mirror (out of a set of mirrors) is located the farthest away from the line-scanned target. Additionally, the embodiments of the present invention use several mirrors to accomplish folded optics so that the optical path is longer than the imaging system. Therefore, by placing the LED so that the line illumination is almost in the same direction as the optical path of the mirror adjacent to it along with the folded optics, images can be captured at both short depth of field and long depth of field using one imager at line illumination peak position by changing the line (row) position on the area imager 250. Additionally, the imager can scan or capture the images with a low F-stop value, removing the need to have two imagers or two F-stop values at the short depth of field and long depth of field.

It is noted that folded optics can include any number of mirrors to lengthen the optical path within an imaging system. In the illustrations in this specification, three mirrors are shown for simplicity. However, varying numbers of mirrors can be used to achieve the folded optics needed to obtain both short and long depths of field. Likewise, a collimating lens can be implemented in embodiments of the present invention. However, other types of lens can be implemented in embodiments of the present invention, such a diverging lens or a converging lens.

In imaging system 200C, another embodiment of the present invention is shown. Rather than use an implementation with one mirror adjacent to one LED or adjacent to two LEDs, imaging system 200C illustrates an embodiment with a line LED 210C flanked by or adjacent to a mirror1 230C and a mirror2 232C. Although the full imaging system is not shown, implementations of the embodiments of the present invention can be achieved by using the mirrors to have optical paths aimed at a target (not shown). Depending on the folded optics used, each mirror can have its own optical path for near field and far field of the whole working range, allowing for an implementation at varying depths of fields. For example, mirror1 230C could possibly enable an imager (not shown) to have a near field while mirror2 232C could possibly enable the imager to have a far field.

In FIGS. 3A and 3B, line-scans 300A and 300B are shown from a conveyor scanning system using a single area camera running two region-of-interest (ROI) modes, where imager reads out one line in each ROI mode. The graph illustration shows line scan illumination for a scanner in a conveyer scanning system. As shown, the line illuminations and folded optics from mirrors are shown which illustrate two possible scans in in each of line scans 300A and 300B. As one can see, one target scan occurs at a near field or short depth of field around 600 millimeters from the imager while another target scan occurs at a far field or long depth of field which is greater than 800 millimeters. In many embodiments, the long depth of field can be greater than 1000 millimeters.

Figure 4:
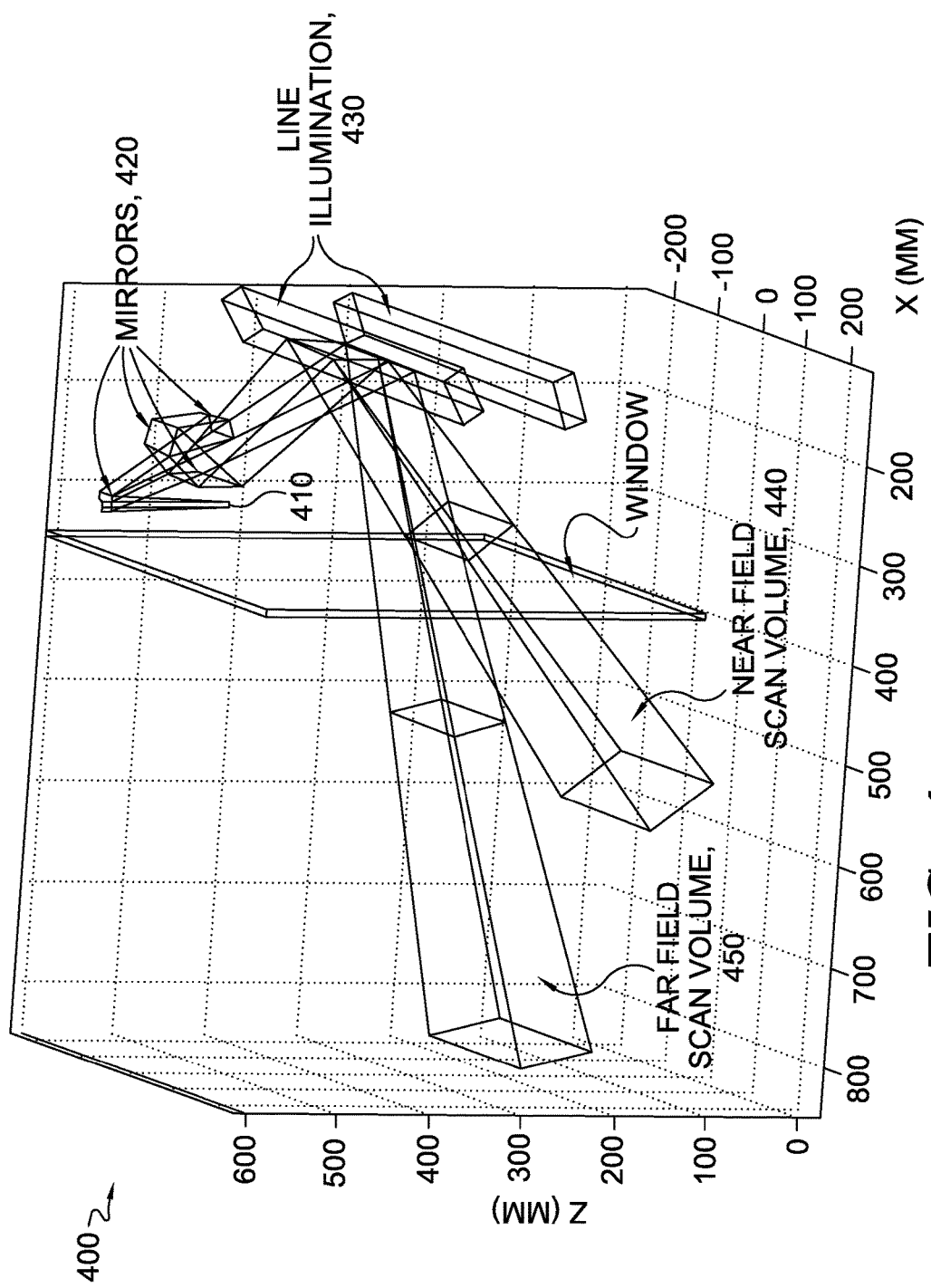
FIG. 4 is an exemplary illustration of a three-dimensional perspective of the line-scans in FIGS. 3A and 3B.

Turning now to FIG. 4, line scan 400 represents a three-dimensional version of the line scans in FIGS. 3A and 3B. As discussed earlier, embodiments of the present invention implement mirrors to accomplish folded optics. Mirrors 420 enable the optical path to be bent so that the optical path is longer than the imaging system. The optical signal or image is scanned at an imager represented by item 410. As discussed earlier, any number of mirrors can be used in order to fold (or bend) the optical path. All mirrors have not been identified in line scan 400.

Line illumination 430 enables light to be shined on a targeted object (not shown). The illustration shows that two line illuminations can occur in the imaging system using one camera or imager. In FIG. 4, two possible scan volumes are possible from the two line illuminations. A near field scan volume 440 is possible at a short depth of field around 600 millimeters. A far field scan volume 450 is possible at a long depth of field greater than 800 millimeters. The illustrations show the implementations of multiple illuminations from a single line scan imaging system.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A line scan camera that scans a long depth of field with a short distance to a target object, comprising:
   an image sensor configured to receive an image of the target object through a collimating lens, wherein the collimating lens has a single F-stop value for a short depth of field and the long depth of field;
   a set of mirrors configured to allow folded optics along an optical path from the target object to the collimating lens, wherein the optical path is bent with the set of mirrors so that the optical path within the line scan camera is longer than a size of the line scan camera, and wherein the folded optics enable the line scan camera to be compact; and
   a first light source configured to illuminate the target object with a line illumination without going through the set of mirrors, wherein the first light source is close to the target, and wherein the light source is located with one of the set of mirrors so that an angle between the line illumination and the optical axis from the one of the set of mirrors to the target object is minimized.

2. The line scan camera of claim 1, wherein the first light source is located at the edge of the one of the set of mirrors.

3. The line scan camera of claim 2, wherein the first light source is a set of light emitting diodes placed in a line.

4. The line scan camera of claim 1, further comprising a second light source that illuminates the target object with a second line illumination without going through the set of mirrors, wherein the second light source is close to the target, and wherein the second light source is located with the one of the set of mirrors and the light source.

5. The line scan camera of claim 4, wherein the first light source and the second light source enable the line scan camera to respectively scan separately at the short depth of field and the long depth of field.

6. The line scan camera of claim 5, wherein the line scan camera has a low F-stop value for both the short depth of field and the long depth of field.

7. An image scanning system that scans a target object at a short depth of field and a long depth of field, comprising:
   a line scan camera located a short distance from the target object;
   the line scan camera comprising:
      an image sensor that receives an image of the target object through at least one collimating lens, wherein the collimating lens has a single F-stop value for a short depth of field and a long depth of field;
      a set of mirrors, located in the line scan camera that bend an optical path from the target object to the at least one collimating lens or imaging lens, and wherein the optical path is longer than a distance from the target object to the at least one collimating lens or imaging lens;
      a set of light emitting diodes located in a line, wherein the set of light emitting diodes illuminates the target object with a line illumination with high illumination efficiency, wherein the set of light emitting diodes is located adjacent to a mirror in the set of mirrors, wherein the mirror in the set of mirrors is located the farthest away from the target object, wherein the set of light emitting diodes and the mirror are located so that an angle between the line illumination and the optical axis from the mirror to the target object is minimized.

8. The image scanning system of claim 7, wherein the set of light emitting diodes is located at the edge of the mirror of the set of mirrors.

9. The image scanning system of claim 8, wherein the set mirrors enable folded optics to occur in the line scan camera.

10. The image scanning system of claim 7, further comprising a second set of light emitting diodes that illuminates the target object with a second line illumination with high illumination efficiency, and wherein the second set of light emitting diodes is located adjacent to the mirror in the set of mirrors and the set of light emitting diodes.

11. The image scanning system of claims 10, wherein the set of light emitting diodes and the second set of light emitting diodes enable the line scan camera to scan separately at a near field and a far field.

12. The line scan camera of claims 11, wherein the line scan camera has a low F-stop value for both the near field and the far field.

* * * * *